United States Patent
Girardeau, Jr. et al.

(10) Patent No.: US 6,665,337 B1
(45) Date of Patent: Dec. 16, 2003

(54) ACTIVATION METHOD IN DATA TRANSCEIVERS

(75) Inventors: James Ward Girardeau, Jr., Sacramento, CA (US); Hiroshi Takatori, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/281,860

(22) Filed: Mar. 31, 1999

(51) Int. Cl.[7] .................................................. H03H 7/30
(52) U.S. Cl. ........................ 375/232; 375/229; 375/230; 375/233
(58) Field of Search ................................ 375/232, 230, 375/233, 229; 381/71.4, 71.8

(56) References Cited

U.S. PATENT DOCUMENTS

| | | | | |
|---|---|---|---|---|
| 4,483,009 A | * | 11/1984 | Honda et al. ................ 375/232 |
| 5,404,409 A | * | 4/1995 | Nagami et al. ............. 381/71.8 |
| 5,418,817 A | * | 5/1995 | Richter ........................ 375/232 |
| 5,499,302 A | * | 3/1996 | Nagami et al. ............. 381/71.4 |
| 5,513,209 A | | 4/1996 | Holm .......................... 375/354 |
| 5,557,646 A | * | 9/1996 | Honma ........................ 375/346 |

\* cited by examiner

*Primary Examiner*—Shuwang Liu
(74) *Attorney, Agent, or Firm*—Blakely, Sokoloff, Taylor & Zafman LLP

(57) ABSTRACT

An activation method for an adaptive equalization in a data transceiver having at least one adaptive filter for adaptive equalization of received sample signals, includes pre-loading a fixed set of coefficients on the at least one adaptive filter in initial activation of the data transceiver. The pre-loaded adaptive filter is allowed to adapt immediately after the activation of the data transceiver. Alternatively, the pre-loaded adaptive filter is allowed to adapt after the activation of the data transceiver and a period of time thereafter. The received timing and/or signals are recovered.

27 Claims, 4 Drawing Sheets

ACTIVATION METHOD IN DATA TRANSCEIVERS

BACKGROUND OF THE INVENTION

1. Field of the Invention

This invention relates in general to a data transceiver and method therein, and more particularly to an activation method in a data transceiver.

2. Description of Related Art

An adaptive equalization method is often used in a data transceiver to compensate for the amplitude and phase distortions introduced by a transmission channel. Generally, an equalizer is a discrete time filter for compensating amplitude and phase distortions. A channel is a time-varying channel with a typically long time constant compared to the symbol period. The channel may be viewed as quasi-static, with a relatively constant impulse response. Equalizers are also used to recover timing so that the local receiver clock and the remote transmitter clock are synchronous. Usually, the local receiver clock and the remote transmitter clock are asynchronous. If the timing is not recovered, the transmitted signal can be lost or additional incorrect signals can be added. If the receiver clock is slower than the transmitter clock, after a long enough period of time, one sample of the received signal will be lost. On the other hand, if the local receiver clock is faster than the remote transmitter clock, after a long enough period of time, an extra sample of the receiver signal will be obtained. Equalizers have been implemented to recover received timing and data in many communication systems.

Further, the equalizers have to be adaptive to compensate continuously for non-idealities of the channel. A data transceiver often uses an adaptive algorithm to correct errors that occur in subsequent information bits. The adaptive algorithm is generally implemented by adaptive filters in the data transceiver.

However, when using an adaptive equalization in a data transceiver, a key requirement is to initially recover timing in the data transceiver. Depending on a transmission system, this can be difficult because severe distortions can occur to the received signals. When initially activating the system, the data transceiver is not yet trained (or adapted) to equalize the received signals.

Because of the various operating conditions of a data transceiver, adaptive algorithms are used to adapt to particular transmission line conditions. In particularly difficult loops (in terms of loop loss and distortion), activation of the system can be difficult and unreliable due to the adaptive filters. One particular problem is the recovering of the received timing.

FIG. 1 depicts a simplified typical data transceiver. The transceiver includes a plurality of adaptive filters: an echo canceller (EC), an automatic gain control (AGC), a feed forward equalizer (FFE), and a decision feedback equalizer (DFE). The echo canceller (EC) removes the transmit signals (TXDAT) from the received signals (RX). A transmitter filter (TX FILTER) shapes the transmit signal spectrum. A D/A converter converts the transient signal to analog signals (TX) to be transmitted. An A/D converter converts the received signals (RX) to a digital representation. The automatic gain control (AGC) optimizes the received signal level. The feed forward equalizer (FFE) whitens noise from the receive signals and removes pre-sample distortion of the received signals. The decision feedback equalizer (DFE) removes post-sample distortion from the received signals. A slicer recovers the received signals (RXDAT). Error signals at the slicer (error_signal) are generated to adapt all of the adaptive filters, AGC, FFE, EC, and DFE. When using such an adaptive equalization method as shown in FIG. 1, recovering received timing can be a problem because severe distortions can occur to the received signals. A "bad" pulse can be shown in FIG. 3B. A large post-sample distortion would create a large amount of inter symbol interference (ISI), making the system difficult to activate.

Therefore, there is a need for an improved adaptive equalization method in a data transceiver. There is a need for a method which makes a data transceiver easy to activate.

SUMMARY OF THE INVENTION

To overcome the limitations in the prior art described above, and to overcome other limitations that will become apparent upon reading and understanding the present specification, the present invention discloses an improved adaptive activation method which makes a data transceiver easy to activate. The present invention provides an easy and reliable activation method for an adaptive equalization in a data transceiver.

The present invention solves the above-described problems by pre-loading at least one of the adaptive filters in the data transceiver with a fixed set of coefficients and allowing the other adaptive filters to adapt. Accordingly, the transmission line is pre-equalized for some of the more difficult conditions, and the data transceiver is easily activated. After the initial activation, all of the adaptive filters are allowed to adapt. The present invention ensures a reliable and robust activation, and it also allows the data transceiver to adapt to various line and noise conditions such that good performance can be achieved.

The present invention provides an activation method for adaptive equalization of received signals in a data transceiver having at least one adaptive filter. In one embodiment, the activation method includes: pre-loading a fixed set of coefficients on at least one adaptive filter to partially equalize the received signals such that the data transceiver obtains initial activation; and adapting the pre-loaded adaptive filter to recover the received timing and/or data. The pre-loaded adaptive filter can be adapted immediately after the activation of the data transceiver, or after the activation and a period of time thereafter. The period of time can be for example a period for recovering the timing and/or data at the data transceiver.

The present invention also provides a method of adaptive equalizing received signals in a data transceiver having a plurality of adaptive filters. In one embodiment, the method includes: pre-loading a fixed set of coefficients on at least one of the adaptive filters; adapting at least one of the remaining adaptive filters to partially equalize the received signals such that the data transceiver obtains initial activation; and adapting all of adaptive filters including at least one pre-loaded adaptive filter to recover the received signals.

One aspect of the adaptive equalization method of the present invention is that the adapting of the pre-loaded adaptive filter is operated immediately after the initial activation of the data transceiver has been achieved.

Another aspect of the adaptive equalization method of the present invention is that the adapting of the pre-loaded adaptive filter is operated after the initial activation of the data transceiver and a period of time thereafter. The period of time is a period of time for recovering received timing and/or signals in the data transceiver.

The present invention further provides a data transceiver for adaptive equalizing received signals. In one embodiment, the data transceiver includes at least one adaptive filter for removing distortions of the received signals; and means for controllably adapting the adaptive filter such that the data transceiver is readily activated, such that the received timing and/or signals are recovered.

One aspect of the data transceiver of the present invention is that the adaptive means pre-loads at least one of the adaptive filter with a fixed set of coefficients to partially equalize the received signals such that the data transceiver is readily activated, and adapts the pre-loaded adaptive filter with adaptive signals. The adapting means allows the pre-loaded adaptive filter to adapt immediately after the data transceiver has been activated, or after the data transceiver has been activated and a period of time thereafter.

In another embodiment of the present invention, the data transceiver includes a plurality of adaptive filters for removing distortions of the received signals; and means for controllably adapting the plurality of adaptive filter such that the data transceiver is readily activated, such that the received timing and/or signals are recovered.

One aspect of the another embodiment of the data transceiver is that the adapting means allows the pre-loaded adaptive filter to adapt with the adaptive signals immediately after activation of the data transceiver has been achieved. Alternatively, the adapting means allows adaptation of at least one of the remaining adaptive filters immediately after the activation of the data transceiver, but allows adaptation of the pre-loaded adaptive filter only after activation of the data transceiver has been achieved and a period of time thereafter.

The present invention also provides a data transceiver for adaptive equalizing received signals with a pre-sample distortion and a post-sample distortion. In one embodiment of the present invention, the data transceiver includes: an echo canceller (EC) for removing transmit signals from the received signals; an automatic gain control (AGC) for optimizing a gain level of the received signals; a feed forward equalizer (FFE), coupled to the automatic gain control (AGC), for whitening noise from the received signals and removing the pre-sample distortion; a slicer, coupled to the feed forward equalizer (FFE), for recovering the received signals; a decision feedback equalizer (DFE), coupled between the slicer and the feed forward equalizer (FFE), for providing feedback signals to the slicer to remove the post-sample distortion; and means for controllably adapting the FFE, EC, AGC, and DFE such that the data transceiver is readily activated, and the received signals are recovered.

One aspect of the present invention is that the adapting means includes an error generator, coupled between input and output of the slicer, for generating error signals. The adapting means pre-loads the FFE with a fixed set of coefficients and adapts at least one of the EC, AGC, and DFE with the error signals to partially equalize the received signals such that the data transceiver is readily activated. The adapting means allows the FFE to adapt with the error signals after the data transceiver has been activated.

Another aspect of the data transceiver of the present invention is that the adapting means allows the FFE to adapt with the error signals immediately after activation of the data transceiver has been achieved. Alternatively, the adapting means allows the FFE to adapt with the error signals after activation of the data transceiver has been achieved and a period of time thereafter.

One advantage of the present inventions is that they ensure a reliable and robust activation. Further, the present inventions allow the data transceiver to adapt to various transmission line and noise conditions in recovering the received data such that good performance can be achieved.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural or implementing changes may be made without departing from the scope of the present invention.

The present invention provides an activation method for adaptive equalization of received signals of a data transceiver. The received signals are partially equalized for initial activation of the data transceiver. Accordingly, the transmission line is pre-equalized for some of the more difficult conditions. Such pre-equalization makes it easy for the data transceiver to activate.

The data transceiver of the present invention utilizes at least one adaptive filter. At least one adaptive filter is pre-loaded with a fixed set of coefficients. The pre-loaded adaptive filter is prevented from adaption until the initial activation is achieved. The pre-loaded adaptive filter may be allowed to adapt immediately after the initial activation of the data transceiver or a period of time after the initial activation. The period of time can be, for example, a period of time for recovering the received timing and/or signals.

Figure 1:
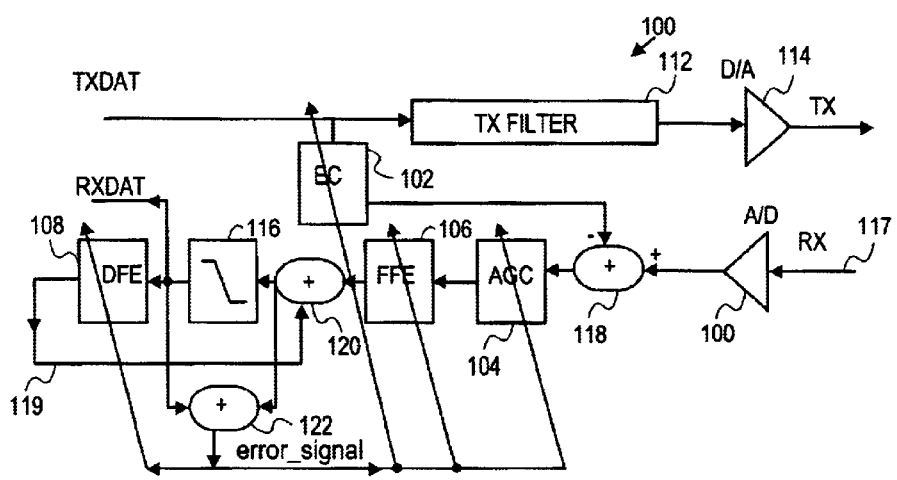
FIG. 1 illustrates a block diagram of a simplified data transceiver.

FIG. 1 illustrates a simplified data transceiver 100. The transceiver 100 includes a plurality of adaptive filters which includes an echo canceller (EC) 102, an automatic gain control (AGC) 104, a feedback forward equalizer (FFE) 106, and a decision feedback equalizer (DFE) 108. The EC 102 removes the transmit signals (TXDAT) from the received signals RX. The received signals RX are converted by an A/D 110. A transmitter filter (TX FILTER) 112 shapes the transmit signal spectrum. A D/A converter 114 converts the transmit signals to analog transmit signals (TX).

Figure 3A:
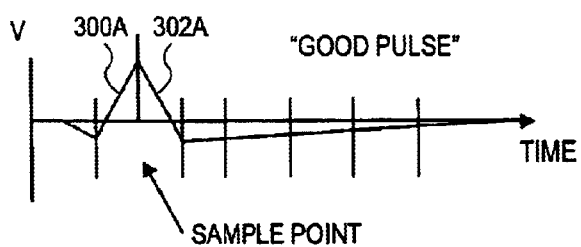
FIG. 3A illustrates a signal pulse-timing diagram with a received sample signal having minimum ISI.
Figure 3B:
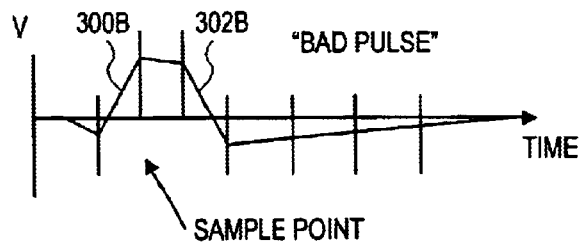
FIG. 3B illustrates a signal pulse-timing diagram with a received sample signal having a large post-sample distortion.
Figure 3C:
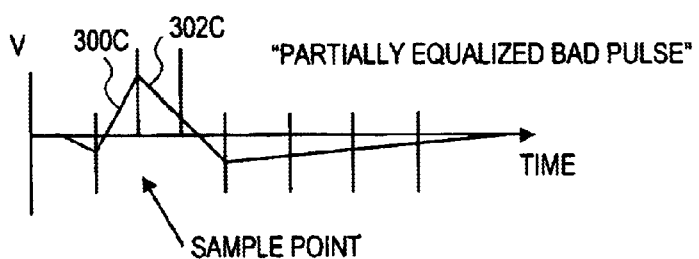
FIG. 3C illustrates a signal pulse-timing diagram with a partially equalized received sample signal under the activation conditions in accordance with the principles of the present invention.

The received signals usually include distortions. The distortion is generally characterized by a pre-sample distortion and a post-sample distortion. Adaptive equalization methods are used to recover received timing of the data transceiver and recover the received signals by moving the pre-sample and post-sample distortions from the received signals. FIGS. 3A–3C each shows a signal pulse-timing diagram having an isolated pulse before adaptive equalization. Each pulse is seen at the input of a slicer 116 (in FIG. 1). The horizontal lines in FIGS. 3A–3C indicate T spaced samples of the pulse. The "sample point" is where the data transceiver samples the pulse. FIG. 3A illustrates a minimum ISI pre-sample component 300a and a minimum ISI post-sample component 302a. This pulse would be received by the transceiver without difficulty, as the sample point is clearly distinguished. FIG. 3B illustrates a pre-sample component 300b and a post-sample component 302b of a distorted received signal. FIG. 3C illustrates a pre-sample component 300c and a post-sample 302c of a distorted received signal after an initiation method in accordance with the principle of the present invention.

In the received signal path 117 of FIG. 1. The traditional adaptive equalization method is to allow all the adaptive filters EC, AGC, FFE, and DFE to adapt from an initial stage for initial activation. The received signals are converted by the A/D 110. The converted signals are inputted into an adder or other equivalent means 118, whereby the EC 102 removes the transmit signals (TXDAT) from the received signals. The received signals are then sent to the AGC 104. The AGC 104 optimizes the received signal level of the signals. The FFE 106 receives the optimized signals from the AGC 104, whereby the FFE 106 whitens noise from the signals and removes pre-sample distortion. The DFE 108 removes post-sample distortion. The slicer 116 recovers the received signals RXDAT from the FFE 106 and the DFE 108. A feedback loop 119 from the DFE 108 includes an adder or other equivalent means 120. Error signals are generated from the input and output of the slicer 116 by an error generator 122. In the traditional adaptive equalization method, the error signals are generated to adapt all of the adaptive filters, AGC, FFE, EC, and DFE at all times including an initial activation stage. When a distorted signal, such as the one shown in FIG. 3B, is received, the large post-sample distortion makes the adaptive filters difficult to initially adapt. The large post-sample distortion creates a large amount of inter symbol interference, making the data transceiver difficult to activate.

Figure 2:
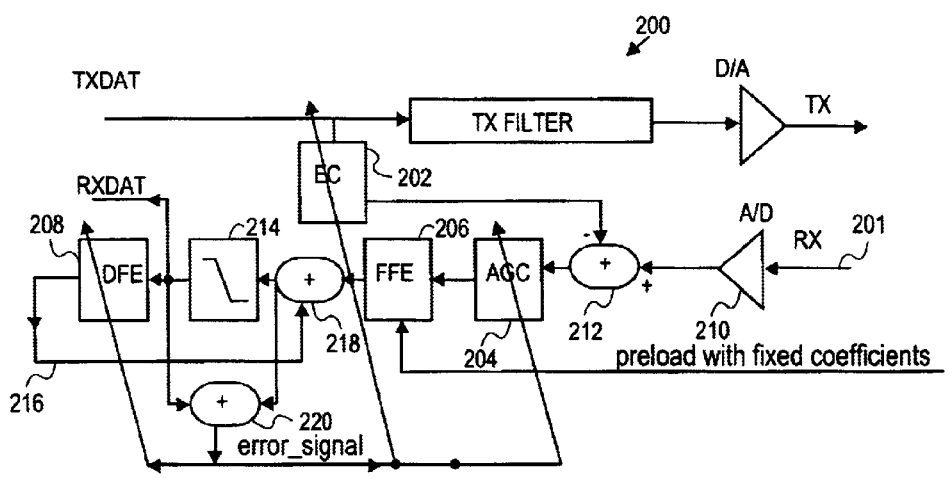
FIG. 2 illustrates a block diagram of a simplified data transceiver under activation conditions in accordance with the principles of the present invention.

In the received signal path 201 of a data transceiver 200 of FIG. 2, the adaptive filters also include the echo canceller (EC) 202, an automatic gain control (AGC) 204, a feed forward equalizer (FFE) 206, and a decision feedback equalizer (DFE) 208. In an adaptive equalization method in accordance with the present invention, the FFE 206 is pre-loaded with a fixed set of coefficients in an initial activation of the data transceiver such that when a signal such as the one shown in FIG. 3B is received, the signal is partially equalized as shown in FIG. 3C. The post-sample distortion is minimized so that the data transceiver is readily activated. Once the data transceiver 200 is activated, the adaptive filter FFE 206 is allowed to adapt. The adaptive filters then recover received timing and/or received signals by removing distortions from the received signals. The FFE 206 can be immediately adapted with the other adaptive filters once the data transceiver 200 is activated, or adapted once the data transceiver 200 is activated and a period of time thereafter. The period of time can be, for example, a period for recovering the received timing and/or signals.

The configuration of the data transceiver 200 may be similar to those in FIG. 1. The received signals are converted by an A/D 210. The converted signals are inputted into an adder or other equivalent means 212, whereby the EC 202 removes the transmit signals (TXDAT) from the received signals. The received signals are then sent to the AGC 204. The AGC 204 optimizes the received signal level of the signals. The FFE 206 receives the optimized signals from the AGC 204, whereby the FFE 206 whitens noise from the signals and removes pre-sample distortion. The DFE 208 removes post-sample distortion of the signals. A slicer 214 recovers the received signals RXDAT from the FFE 206 and the DFE 208. A feedback loop 216 from the DFE 208 includes an adder or other equivalent means 218. Error signals are generated from the input and output of the slicer 214 by an error generator 220. The error signals are generated to adapt the adaptive filters, AGC, EC, and DFE initially, and after the initial activation of the data transceiver 200, adapt AGC, EC, FFE, and DFE. During the initial activation stage, the adaptive filter FFE is pre-loaded with a fixed set of coefficients.

It is appreciated to a person skilled in the art that other adaptive filter(s) may be pre-loaded with a fixed set of coefficients and then allowed to adapt after the initial activation stage in accordance with the principles of the present invention. It will also be appreciated that other types of adaptive filters besides the ones shown in FIGS. 1 and 2 can be implemented, and that an initiation method to control these adaptive filters in accordance with the principles of the present invention can be used.

Figure 4:
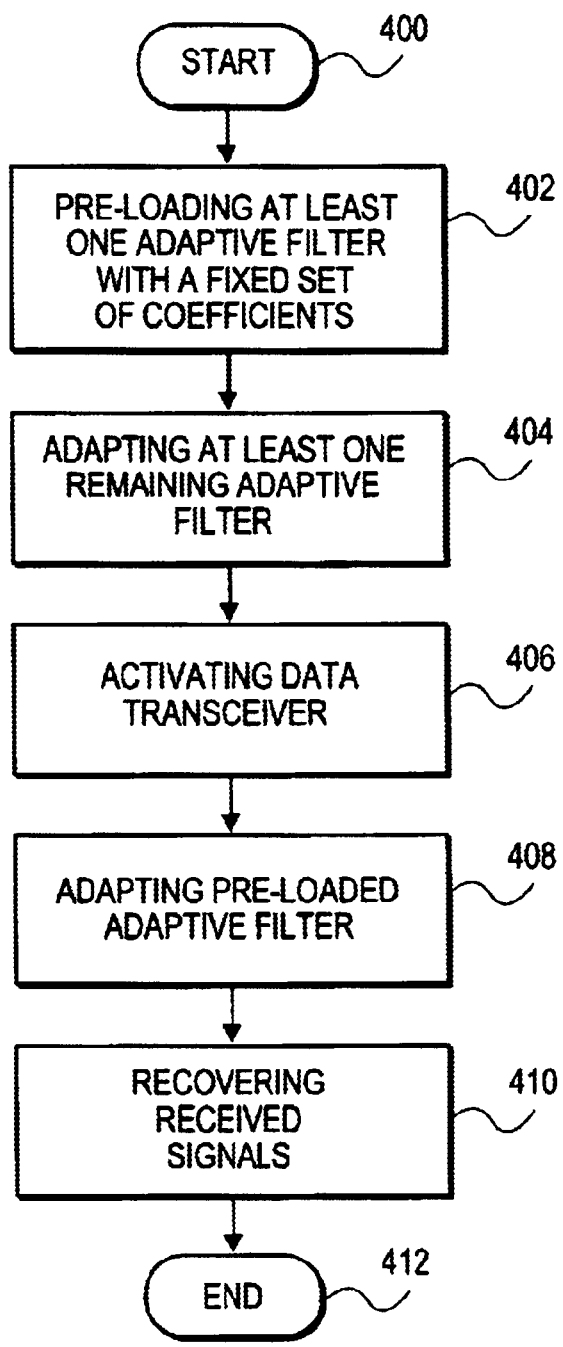
FIG. 4 illustrates a flow chart of an adaptive equalization operation of received signals in a data transceiver including an initiation method in accordance with the principles of the present invention.

FIG. 4 illustrates a flow chart of an adaptive equalization operation of received signals in a data transceiver, such as the data transceiver 200 in FIG. 2. The operation includes an initial activation of the data transceiver in accordance with the principles of the present invention. The operation starts in box 400. At least one adaptive filter is pre-loaded with a fixed set of coefficients to partially equalize the received signals in box 402, and at least one remaining adaptive filter is allowed to adapt in box 404, such that the data transceiver is easily activated in box 406. When the initial activation is achieved, the pre-loaded adaptive filter is allowed to adapt in box 408. The received signals are recovered in box 410. The adaptive equalization operation ends in box 412.

The foregoing description of the exemplary embodiment and operation of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An activation method for adaptive equalization of received signals in a data transceiver having a plurality of adaptive filters, comprising:
    pre-loading a fixed set of coefficients on at least one of the plurality of adaptive filters to partially equalize the received signals;
    adapting at least one of the remaining adaptive filters with the partially equalized received signals such that the data transceiver obtains initial activation; and
    adapting the at least one pre-loaded adaptive filter after initial activation of the data transceiver has been obtained.

2. The method of claim 1, wherein the adapting of the pre-loaded adaptive filter is operated immediately after the initial activation of the data transceiver has been achieved.

3. The method of claim 1, wherein the adapting of the pre-loaded adaptive filter is operated after the initial activation of the data transceiver has been achieved and a period of time thereafter.

4. The method of claim 3, wherein the period of time is a period of time for recovering received timing in the data transceiver.

5. The method of claim 3, wherein the period of time is a period of time for recovering received timing and signals in the data transceiver.

6. A method of adaptive equalizing received signals in a data transceiver having a plurality of adaptive filters, comprising:

pre-loading a fixed set of coefficients on at least one of the adaptive filters to partially equalize the received signals;

adapting at least one of the remaining adaptive filters with the partially equalized received signals such that the data transceiver obtains initial activation; and adapting the plurality of adaptive filters including the at least one pre-loaded adaptive filter after the data transceiver obtains initial activation to recover the received signals.

7. The method of claim 6, wherein the adapting of the at least one pre-loaded adaptive filter is operated immediately after the initial activation of the data transceiver has been achieved.

8. The method of claim 6, wherein the adapting of the at least one pre-loaded adaptive filter is operated after the initial activation of the data transceiver has been achieved and a period of time thereafter.

9. The method of claim 8, wherein the period of time is a period of time for recovering received timing in the data transceiver.

10. The method of claim 8, wherein the period of time is a period of time for recovering received timing and signals in the data transceiver.

11. A data transceiver for adaptive equalizing received signals with a pre-sample distortion and a post-sample distortion, comprising:

an echo canceller (EC) for removing transmit signals from the received signals;

an automatic gain control (AGC) for optimizing a gain level of the received signals;

a feed forward equalizer (FFE), coupled to the automatic gain control (AGC), for whitening noise from the received signals and removing the pre-sample distortion;

a slicer, coupled to the feed forward equalizer (FFE), for recovering the received signals;

a decision feedback equalizer (DFE), coupled between the slicer and the feed forward equalizer (FFE), for providing feedback signals to the slicer to remove the post-sample distortion; and means for controllably adapting the FFE, EC, AGC, and DFE such that the data transceiver is readily activated, and the received signals are recovered, said adapting means configured to pre-load at least one of the EC, AGC, FFE, and DFE with a fixed set of coefficients to partially equalize the received signals, adapt at least one of the remaining adaptive filters with the partially equalized received signals such that the data transceiver obtains activation, and adapt the at least one pre-loaded adaptive filter after activation of the data transceiver has been obtained.

12. The data transceiver of claim 11, wherein the adapting means further includes an error generator, coupled between input and output of the slicer, for generating error signals, and the adapting means pre-loads the FFE with a fixed set of coefficients and adapts at least one of the EC, AGC, and DFE with the error signals such that the data transceiver is readily activated, and the adapting means allows the FFE to adapt with the error signals immediately after activation of the data transceiver has been achieved.

13. The data transceiver of claim 11, wherein the adapting means allows the FFE to adapt with the error signals after activation of the data transceiver has been achieved and a period of time thereafter.

14. The data transceiver of claim 13, wherein the period of time is a period of time for recovering received timing in the data transceiver.

15. The data transceiver of claim 13, wherein the period of time is a period of time for recovering received timing and signals in the data transceiver.

16. A data transceiver for adaptive equalizing received signals, comprising:

a plurality of adaptive filters, wherein at least one of the plurality of adaptive filters is capable of removing distortions of the received signals; and means for controllably adapting the at least one adaptive filter such that the data transceiver is readily activated, and the received signals are recovered, said adapting means configured to pre-load the at least one adaptive filter with a fixed set of coefficients to partially equalize the received signals, adapt at least one of the remaining adaptive filters with the partially equalized received signals such that the data transceiver obtains activation, and adapt the at least one pre-loaded adaptive filter after activation of the data transceiver has been obtained.

17. The data transceiver of claim 16, wherein the adaptive means adapts the pre-loaded adaptive filter with adaptive signals.

18. The data transceiver of claim 17, wherein the adapting means allows the at least one pre-loaded adaptive filter to adapt with the adaptive signals immediately after the data transceiver has been activated.

19. The data transceiver of claim 17, wherein the adapting means allows the at least one pre-loaded adaptive filter to adapt with the adaptive signals after the data transceiver has been activated and a period of time thereafter.

20. The data transceiver of claim 19, wherein the period of time is a period of time for recovering received timing in the data transceiver.

21. The data transceiver of claim 19, wherein the period of time is a period of time for recovering received timing and signals in the data transceiver.

22. The data transceiver of claim 16, wherein the at least one adaptive filter is capable of converging.

23. The data transceiver of claim 16, wherein the at least one adaptive filter include an automatic gain control (AGC) for optimizing the received signals.

24. The data transceiver of claim 16, wherein the at least one adaptive filter includes a feed forward equalizer (FFE) for whitening noise from the received signals and removing a pre-sample distortion of the distortions.

25. The data transceiver of claim 16, wherein the at least one adaptive filter includes a decision feedback equalizer (DFE) for removing a post-sample distortion of the distortions.

26. The data transceiver of claim 16, wherein the at least one adaptive filter includes an echo canceller (EC) for removing transmit signals from the received signals.

27. The data transceiver of claim 16, wherein the plurality of adaptive filters comprises a feed forward equalizer (FFE), an automated gain control (AGC), a decision feedback equalizer (DFE), and an echo canceller (EC).

* * * * *

UNITED STATES PATENT AND TRADEMARK OFFICE
CERTIFICATE OF CORRECTION

PATENT NO. : 6,665,337 B1  Page 1 of 1
DATED : December 16, 2003
INVENTOR(S) : Girardeau, Jr. et al.

It is certified that error appears in the above-identified patent and that said Letters Patent is hereby corrected as shown below:

Column 5,
Line 24, after "post-sample", insert -- component --.

Column 6,
Line 65, insert -- at least one --.

Column 7,
Line 1, insert -- at least one --.

Column 8,
Line 32, immediately before "pre-loaded", insert -- at least one --.

Signed and Sealed this

Sixteenth Day of March, 2004

JON W. DUDAS
*Acting Director of the United States Patent and Trademark Office*